United States Patent
Huseth et al.

(10) Patent No.: US 10,839,176 B2
(45) Date of Patent: Nov. 17, 2020

(54) SELF-IDENTIFYING PERSONAL PROTECTIVE DEVICE AND METHODS OF MONITORING THE SAME

(71) Applicant: HONEYWELL INTERNATIONAL INC., Morris Plains, NJ (US)

(72) Inventors: Steve D. Huseth, Plymouth, MN (US); Gregory Vrablik, Brea, CA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/109,442

(22) Filed: Aug. 22, 2018

(65) Prior Publication Data
US 2020/0065530 A1    Feb. 27, 2020

(51) Int. Cl.
| | |
|---|---|
| *G06K 7/10* | (2006.01) |
| *G06F 16/955* | (2019.01) |
| *A62B 7/02* | (2006.01) |
| *A62B 9/00* | (2006.01) |
| *A62B 9/02* | (2006.01) |
| *A62B 18/02* | (2006.01) |

(52) U.S. Cl.
CPC .......... *G06K 7/10366* (2013.01); *A62B 7/02* (2013.01); *A62B 9/006* (2013.01); *A62B 9/02* (2013.01); *A62B 18/02* (2013.01); *G06F 16/9554* (2019.01)

(58) Field of Classification Search
CPC ...... G06K 7/10366; A62B 7/02; A62B 9/006; A62B 9/02; A62B 18/02
USPC ................................................ 235/492, 451
See application file for complete search history.

(56) References Cited

U.S. PATENT DOCUMENTS

| | | | | |
|---|---|---|---|---|
| 6,121,881 | A | * | 9/2000 | Bieback ................. A62B 18/08 128/201.19 |
| 2004/0100384 | A1 | | 5/2004 | Chen et al. |
| 2010/0039229 | A1 | * | 2/2010 | Westerlund ........... A62B 18/08 340/10.1 |
| 2011/0227700 | A1 | | 9/2011 | Hamerly et al. |
| 2013/0197951 | A1 | * | 8/2013 | Watson ................. G06Q 10/06 705/7.12 |

(Continued)

FOREIGN PATENT DOCUMENTS

| | | |
|---|---|---|
| KR | 10-2017-0006871 A | 1/2017 |
| KR | 10-1887165 B1 | 9/2018 |

OTHER PUBLICATIONS

Honeywell Titan SCBA: Product Features, 1-3, https://www.honeywellsafety.com/TitanSCBA/ProductFeatures/?LangType=1033, Sep. 19, 2018.

(Continued)

*Primary Examiner* — Paultep Savusdiphol
(74) *Attorney, Agent, or Firm* — Alston & Bird LLP

(57) ABSTRACT

Provided is self-identifying personal protective equipment and methods of monitoring the same. The personal protective equipment may include a wireless tag positioned on or incorporated into an individual's face piece and a wireless tag reader positioned on or incorporated into the breathing apparatus of the personal protective equipment. The wireless tag reader may transmit an interrogation signal to the wireless tag upon actuation of the breathing apparatus, such as actuation of the flow of air through the breathing apparatus to the face piece. The face piece may then be identified automatically with the use of the personal protective equipment.

19 Claims, 10 Drawing Sheets

(56) References Cited

U.S. PATENT DOCUMENTS

| | | | |
|---|---|---|---|
| 2013/0319408 A1* | 12/2013 | Zwolinsky et al. | ........................ A61M 16/0066 128/202.22 |
| 2014/0068063 A1* | 3/2014 | Carr | ..................... G08B 25/016 709/224 |
| 2016/0271428 A1 | 9/2016 | Ehler et al. | |
| 2016/0317845 A1 | 11/2016 | Zwolinsky et al. | |
| 2019/0206233 A1* | 7/2019 | Huseth | ................. G08B 25/016 |

OTHER PUBLICATIONS

Extended European Search Report for Application No. 19192680.7, dated Dec. 10, 2019, 9 pages.
Communication pursuant to Rules 70(2) and 70a(2) for Application No. 19192680.7, dated Mar. 2, 2020, 2 pages.
Annex to the communication dated Jun 18, 2020 for EP Application No. 19192680.
Communication from the Examining Division dated Jun 18, 2020 for EP Application No. 19192680.
Office Action for Korean Patent Application No. 10-2019-0096682 dated Aug. 31, 2020, 21 pages.

\* cited by examiner

SELF-IDENTIFYING PERSONAL PROTECTIVE DEVICE AND METHODS OF MONITORING THE SAME

BACKGROUND

A self-contained breathing apparatus ("SCBA") is a device used to provide air to the user when the air of the environment is dangerous for the user to breathe. Such environments may be deemed "immediately dangerous to life and health" or "IDLH" environments. SCBAs are often used by firefighters or other first responders when in dangerous environments. Applicant has identified a number of deficiencies and problems associated with conventional SCBAs. Through applied effort, ingenuity, and innovation, many of these identified problems have been solved by developing solutions that are included in embodiments of the present invention, many examples of which are described in detail herein.

BRIEF SUMMARY

In general, embodiments of the present invention provided herein include methods, devices, systems, and computer program products for monitoring personal protective equipment. In some embodiments, a system may be provided to monitor a wireless communication enabled personnel protective equipment (PPE). The system may include a face piece having a wireless tag configured to store unique identification information; and a breathing apparatus corresponding to the wireless communication enabled PPE and configured to be coupled to the face piece. The breathing apparatus may include a wireless tag reader, where the wireless tag reader is configured to transmit an interrogation signal on actuation of the breathing apparatus, after the breathing apparatus is coupled to the face piece, and receive a response signal comprising the unique identification information from the wireless tag. The breathing apparatus may be configured to transmit the unique identification information to a central monitoring station.

In some embodiments, the breathing apparatus may include a valve configured to regulate air flow through the breathing apparatus and an actuator configured to actuate the valve to allow air to flow through the breathing apparatus, wherein the breathing apparatus is actuated by actuation of the valve. The personal protective equipment may be associated with a user and the unique identification information identifies the user. The breathing apparatus may include a regulator configured to be removably coupled to the face piece and supply air from an air tank to the face piece, where the wireless tag reader is positioned on the regulator.

In some embodiments, the system may also include one or more sensing units configured to detect one or more physical parameters associated with a user of the face piece, the face piece, the breathing apparatus, or a combination thereof, the one or more sensing units being positioned on the face piece, breathing apparatus, or a combination thereof. In some embodiments, the one or more physical parameters may correspond to at least one of: a breathing rate of the user of the face piece, a location of the user of the face piece, pressure of air flow in a regulator of the breathing apparatus, air pressure in an air tank of the breathing apparatus, battery level of the breathing apparatus, alarm status of a personal alert safety system device, operation mode of the personal alert safety system device, heat alert activation, or a battery level of the wireless tag reader.

In some embodiments, the system may further include a communication device positioned on the face piece, breathing apparatus, or combination thereof, wherein the communication device is configured to transmit the one or more physical parameters to the central monitoring station. In some embodiments, the wireless tag reader may be configured to transmit the one or more physical parameters to the central monitoring station. In some embodiments, the wireless tag reader may be positioned proximate to the wireless tag when the breathing apparatus is coupled to the face piece.

In some embodiments, the wireless tag may be a Bluetooth tag, and the wireless tag reader may be a Bluetooth transceiver unit. In some embodiments, the wireless tag may be an RFID tag, and the wireless tag reader may be an RFID transceiver unit.

In some embodiments, the unique identification information may be stored in a database of the central monitoring station, where the database is configured to store each of the identification information for each of user of the breathing apparatus, identification information for the breathing apparatus, and where the central monitoring station is configured to pair the unique identification information to the identification information of the breathing apparatus.

In some embodiments, the wireless tag reader may be configured to interrogate the wireless tag at a regular interval of time to identify the face piece. In some embodiments, the wireless tag reader may be configured to be switched on for a set duration of time when the actuator is actuated.

In some embodiments, the interrogation signal, from the wireless tag reader, may be configured to energize the wireless tag such that an antenna structure of the wireless tag is powered sufficiently to transmit and receive signals.

In some embodiments, the wireless tag reader may be configured to compare one or more characteristics of the response signal to one or more characteristics of a response signal from another wireless tag to determine which wireless tag is associated with the face piece coupled to the breathing apparatus. The one or more characteristics may include a time of arrival of the response signal, an amount of energy associated with the response signal, or an angle associated with the receiving signal.

Another embodiment of the present invention provided is a method of monitoring a wireless communication enabled personnel protective equipment (PPE). The method may include transmitting an interrogation signal in response to actuation of a breathing apparatus, after the breathing apparatus is mechanically coupled to a face piece. The face piece may include a wireless tag configured to store unique identification information and the breathing apparatus may include a wireless tag reader configured to transmit the interrogation signal. The method may further include receiving a response signal from the wireless tag, the response signal including the unique identification information; and causing the unique identification information to be transmitted to a central monitoring station. In some embodiments, the actuation of the breathing apparatus may occur by actuation of a flow of air through the breathing apparatus. In some embodiments, the breathing apparatus may be a powered air purifying respirator or a self-contained breathing apparatus. In some embodiments, the unique identification information may correspond to an identity of a first responder or industrial worker using the face piece.

BRIEF DESCRIPTION OF THE FIGURES

Reference will now be made to the accompanying drawings, which are not necessarily drawn to scale, and wherein.

DETAILED DESCRIPTION

Figure 1:
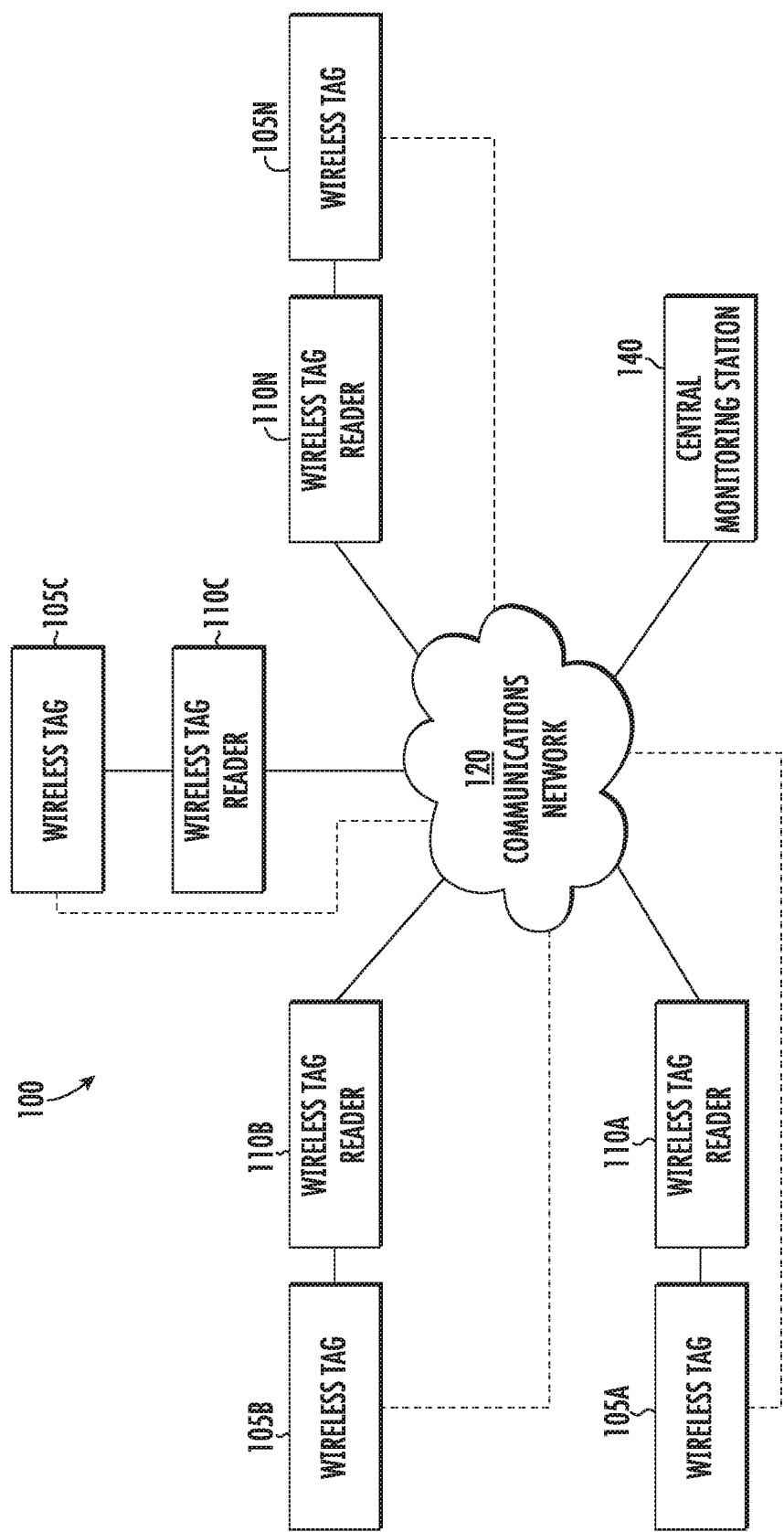
FIG. 1 illustrates an example system in accordance with some embodiments discussed herein.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a device is described herein to receive data from another device, it will be appreciated that the data may be received directly from the another device or may be received indirectly via one or more intermediary devices, such as, for example, one or more servers, relays, routers, network access points, base stations, hosts, repeaters, and/or the like, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, hosts, repeaters, and/or the like.

The term "user" should be understood to refer to an individual wearing the device. The terms "user profile," "user account," and "user account details" refer to information associated with a user, including, for example, a user identifier, an email address, a real name (e.g., John Doe), a username (e.g., jdoe), a password, a real name, a time zone, a status, and the like. As used herein, the term "user profile data" refers to any data associated with a user profile, such as, but not limited to, biographical data or any other data that may serve to distinguish one or more profiles from each other. As used herein, the term "biographical data" refers to information associated with a person(s) identified in a profile, such as, for example, birth dates, allergies, employment information, login credential information, and/or any other identifying information about a profile.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "transmitter" refers to any component that can generate radio waves for communication purposes while a "receiver" is used to generally refer to any component that can receive radio waves and convert the information into useable form. A "transceiver" generally refers to a component that can both generate radio waves and receive radio waves and is thus contemplated when either a transmitter or a receiver is discussed.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

Various embodiments of the invention are directed to systems, methods, and devices that are configured to self-identify a user wearing personal protective equipment. The personal protective equipment (PPE) is configured to provide identification of the user wearing the PPE without the user needing to manually log-in or otherwise manually identify themselves. As used herein, "personal protective equipment" or "PPE" may refer to the various components of the PPE, such as a face piece and breathing apparatus, as a whole. The "user of the PPE" refers to the user of both the face piece and the breathing apparatus together. When referring to monitoring the PPE, such monitoring may be of the face piece, breathing apparatus, or combination thereof.

PPE are used by firefighters, first-responders, industry workers, and others for protection in dangerous environments. In many cases, components of PPE may be shared among a group of individuals. In some instances, it may be desired to monitor the PPE to monitor the user of the PPE and ensure the user is appropriately protected by the PPE. For instance, a self-contained breathing apparatus (SCBA), such as those used by firefighters or first-responders, may communicate the identity of a user together with the status of the SCBA to an incident command center monitoring an incident to allow for tracking of the SCBA and the user. Such tracking may require the user to "log in" to the specific SCBA being used. However, users may change SCBA on each shift requiring the user to be diligent in logging in prior to the start of the shift. This frequent change of association of the SCBA with the firefighters is difficult to track. Moreover, the firefighters at times forget to log into the SCBA prior to use. Failing to properly log in to the SCBA may result in the incident commander receiving incorrect firefighter information which can result in confusion during a critical incident leading to response delays. An RFID tag issued to a firefighter may be touched to an RFID tag reader on the SCBA for the firefighter to log in. However, the issued RFID tags are susceptible to being lost or damaged in addition to the firefighter forgetting to perform the log in function. The current RFID tag system may be particularly challenging for smaller fire departments (e.g., volunteer fire departments) where different firefighters may use the same SCBA back pack in one day.

Firefighters change SCBA every shift. However, face pieces of PPE may be assigned to an individual firefighter such that the face piece is not shared. In the present disclosure, a wireless tag may be integrated into or mounted on the face piece and a wireless tag reader may be integrated into or mounted on the rest of the personal protective equipment, such as the breathing apparatus. When the breathing apparatus is connected to the face piece, the wireless tag may be read by the wireless tag reader, which then transmits the identification of the wireless tag to a central monitoring station, such as an incident command center. The mating of the face piece to the breathing apparatus may allow the PPE to identify the firefighter without requiring the firefighter to explicitly log in, scan a separate RFID tag, or otherwise take an action beyond turning on the breathing apparatus. This configuration may eliminate a key failure point of monitoring systems.

In the present disclosure, each wireless tag may be assigned a specific user. When the user mates the breathing apparatus to the face piece and activates the breathing apparatus, the user may be automatically identified. Additional log in steps may not be needed. When the firefighter changes the breathing apparatus, e.g., attaches a different regulator to the face piece, and activates the breathing apparatus, the user is then again identified and associated with the new breathing apparatus. Multiple users may use an individual breathing apparatus and in each instance, the new user may be identified and associated with the PPE until the face piece and breathing apparatus are disconnected.

The face piece, unique for each user, may include a wireless tag that stores identification information for the user. The wireless tag reader may be affixed to or incorporated into the breathing apparatus, such as the second stage regulator or other part of the breathing apparatus that is then connected to the face piece. When the breathing apparatus is coupled to the face piece and the user activates the breathing apparatus (e.g., by turning on the flow of air through the breathing apparatus), the wireless tag reader may automatically identify the wireless tag associated with the face piece, thus keeping track of the association of the user with the PPE.

Integrating the wireless tag into the face piece and designing the breathing apparatus to read the wireless tag may allow for automatic identification of the user and may thus eliminate the potential of the user to forget to log in. The wireless tag may also be read as part of inventory tracking of the face piece and may be used by the user to check-in to other systems such as training systems and other specialized equipment that require a unique user ID.

In some embodiments, the wireless tag may be mounted or integrated into the face piece at any location of the face piece. In some embodiments, the wireless tag reader may be mounted or integrated into the first or second stage regulator or other part of the breathing apparatus. For instance, the wireless tag reader may be located on or integrated into second stage regulator/HUD modules, or located on or integrated into second stage regulator assemblies. When the second stage regulator is connected to the face piece, the proximity of the wireless tag to the wireless tag reader may allow information to be transferred to the wireless tag reader and execute log-in of the user to the PPE. The information may then be transferred to the central monitoring station, such as an incident command center.

The self-identifying PPE may be used in a variety of settings such as industrial or research settings (e.g., where contamination may be an issue), rescue scenarios, and any other setting where monitoring of a user is desired.

In some embodiments, the self-identifying PPE may include sensors or other measuring devices to identify or track other data as well as identify the user of the PPE. For instance, in some embodiments, the self-identifying PPE may include sensors to measure or detect telemetry data (e.g., temperature, pressure, motion) and may include one or more communication devices to transmit the telemetry data. In some embodiments, identification information concerning the face piece may be transmitted along with telemetry data to a central monitoring station. The identification information may be unique identification information in that the identification information is particular to the face piece, user of the face piece, and/or breathing apparatus.

In some embodiments, when the flow of air is actuated, the wireless tag reader (e.g., low frequency wireless tag readers for low range transmissions) may activate for a set duration of time (e.g., 30 seconds, 1 minute, 2 minutes, 3 minutes, 4 minutes, 5 minutes, etc.) and transmit an interrogation signal (e.g., a low frequency interrogation signal). The wireless tag positioned on the face piece may respond to the interrogation signal by transmitting a response signal that may include identification information to the wireless tag reader.

In some embodiments, pairing or sharing of information between the wireless tag reader and the wireless tag may be made possible after the wireless tag reader compares the response time or energy associated with the response signal of a plurality of wireless tags to the interrogation signal to determine which of the wireless tags is likely associated with the user of the PPE in question (that is, the PPE containing the wireless tag reader).

Methods, apparatuses, systems, and computer program products of the present invention may be embodied by any of a variety of devices. For example, the method, apparatus, systems, and computer program product of an example embodiment may be embodied by a networked device (e.g., an enterprise platform), such as a server or other network entity, configured to communicate with one or more devices, such as PPE. Additionally or alternatively, the system may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 shows personal protection system 100 including an example network architecture for a system, which may include one or more devices and sub-systems that are configured to implement some embodiments discussed herein. For example, personal protection system 100 may include central monitoring station 140, which can include, for example, the circuitry disclosed in FIGS. 2-3B, a server, or database, among other things (not shown). The central monitoring station 140 may include any suitable network server and/or other type of computing device. In some embodiments, the central monitoring station 140 may receive, determine, and transmit alarms, commands, and instructions to wireless tag reader 110A-110N and/or wireless tag 105A-105N using data from the personal identification database 300. The personal identification database 300 (shown e.g., in FIGS. 3A and 3B) may be embodied as a data storage device such as a Network Attached Storage (NAS) device or devices, or as a separate database server or servers. The personal identification database 300 includes information accessed and stored by the central monitoring station 140 to facilitate the operations of the personal protection system 100. For example, the personal identification database 300 may include, without limitation, a plurality of user profile data, telemetry data, location data, central monitoring station data, PPE data, etc.

Central monitoring station 140 can communicate with one or more wireless tag readers 110A-110N and/or wireless tags 105A-105N via communications network 120. In this regard, network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 120 may include a cellular telephone, an 802.11, 802.16, 802.20, and/or WiMax network. Further, the communications network 120 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the personal protection system.

The central monitoring station 140 may provide for receiving of electronic data from various sources, including but not necessarily limited to the wireless tag readers 110A-110N and/or wireless tags 105A-105N. For example, the central monitoring station 140 may be operable to receive or transmit user profile data, telemetry data, location data, central monitoring station data, PPE data provided by the wireless tag readers 110A-110N and/or wireless tags 105A-105N.

Wireless tag readers 110A-110N and/or wireless tags 105A-105N and/or central monitoring station 140 may each be implemented as a personal computer and/or other networked device, such as a cellular phone, tablet computer, mobile device, inventory management terminal etc. that may be used for any suitable purpose in addition to monitoring the PPE. The depiction in FIG. 1 of "N" devices is merely for illustration purposes. Any number of wireless tags and wireless tag readers may be included in the personal protection system 100. In one embodiment, the wireless tag readers 110A-110N and/or wireless tags 105A-105N may be configured to view, create, edit, and/or otherwise interact with identification information and/or physical parameters of the user, PPE, and/or environment in which the PPE is located, which may be provided by the central monitoring station 140, wireless tag readers 110A-110N, wireless tags 105A-105N, or other devices in the personal protection system 100. According to some embodiments, the central monitoring station 140 may be configured to display the identification information and/or physical parameters on a display of the central monitoring station 140 for viewing, creating, editing, and/or otherwise interacting with the data. In some embodiments, an interface of a wireless tag reader 110A-110N and/or wireless tag 105A-105N may be different from an interface of a central monitoring station 140. The wireless tag readers 110A-110N and/or wireless tags 105A-105N may be used in addition to or instead of the central monitoring station 140. Personal protection system 100 may also include additional client devices and/or servers, among other things. Additionally or alternatively, the wireless tag reader 110A-110N and/or wireless tag 105A-105N may interact with the personal protection system 100 via a web browser. As yet another example, the wireless tag reader 110A-110N and/or wireless tag 105A-105N may include various hardware or firmware designed to interface with the personal protection system 100.

In some embodiments, the wireless tags 105A-105N are RFID tags, Bluetooth tags, or other suitable wireless identifiers. The wireless tag readers 110A-110N may be any appropriate scanner or reader suitable to transmit one or more interrogation signals to the respective wireless tag 105A-105N, receive a response signal from the wireless tag 105A-105N, and cause identification information to be transmitted, e.g., to a central monitoring station 140. In some embodiments, the wireless tag readers 110A-110N and/or wireless tags 105A-105N may include any computing device as defined above. Electronic data received by the central monitoring station 140 from the wireless tag readers 110A-110N and/or wireless tags 105A-105N may be provided in various forms and via various methods. In some embodiments, the wireless tag readers 110A-110N and/or wireless tags 105A-105N may include mobile devices, wearables, and the like.

In embodiments where a wireless tag reader 110A-110N and/or wireless tag 105A-105N is a mobile device, such as a smart phone or tablet, the wireless tag reader 110A-110N and/or wireless tag 105A-105N may execute an "app" to interact with the personal protection system 100. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

In some embodiments of an exemplary personal protection system 100, information may be sent from a wireless tag reader 110A-110N and/or wireless tag 105A-105N to a central monitoring station 140. In various implementations, the information may be sent to the personal protection system 100 over communications network 120 directly by a wireless tag reader 110A-110N and/or wireless tag 105A-105N, the information may be sent to the personal protection system 100 via an intermediary such as a client device, message server, and/or the like. For example, the wireless tag reader 110A-110N and/or wireless tag 105A-105N may communicate with a desktop, a laptop, a tablet, a smartphone, and/or the like that is executing a client application to interact with the personal protection system 100. In one implementation, the information may include data such as user profile data, telemetry data, location data, central monitoring station data, PPE data, and/or the like.

The personal protection system 100 may comprise at least one central monitoring station 140 that may create a storage data entry based upon the received information to facilitate indexing and storage in a personal identification database 300, as will be described further below. In one implementation, the storage data entry may include data such as a user profile data, telemetry data, location data, central monitoring station data, PPE data, and/or the like.

In embodiments, a user profile as defined above may be associated with the identification information.

In one implementation, the identification information may be parsed (e.g., using PHP commands) to determine a user wearing the PPE, context of the use of the PPE, information concerning the PPE, information concerning the user of the PPE, etc.

Figure 2:
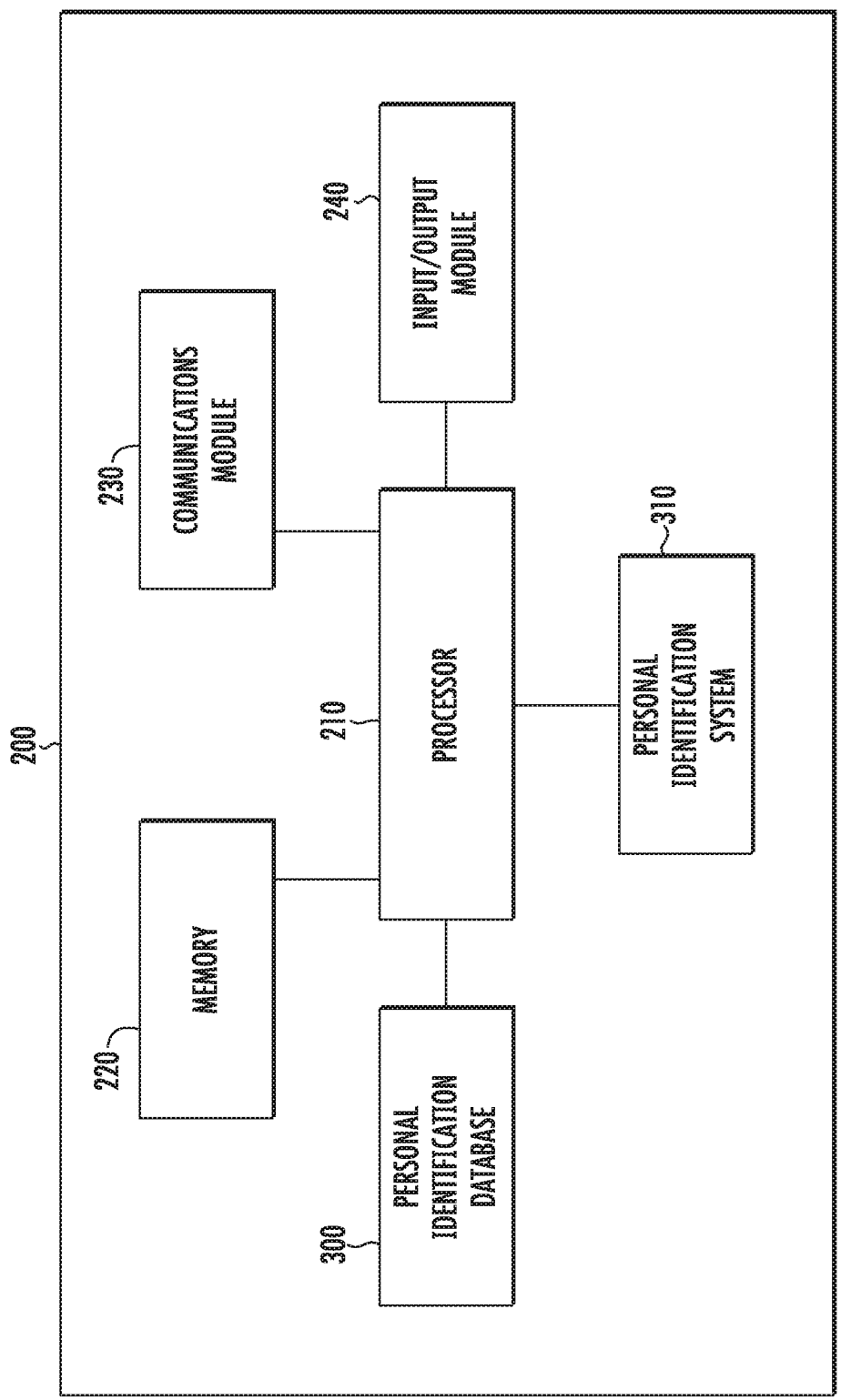
FIG. 2 illustrates a schematic block diagram of circuitry that can be included in a device in accordance with some embodiments discussed herein.
Figure 3A:
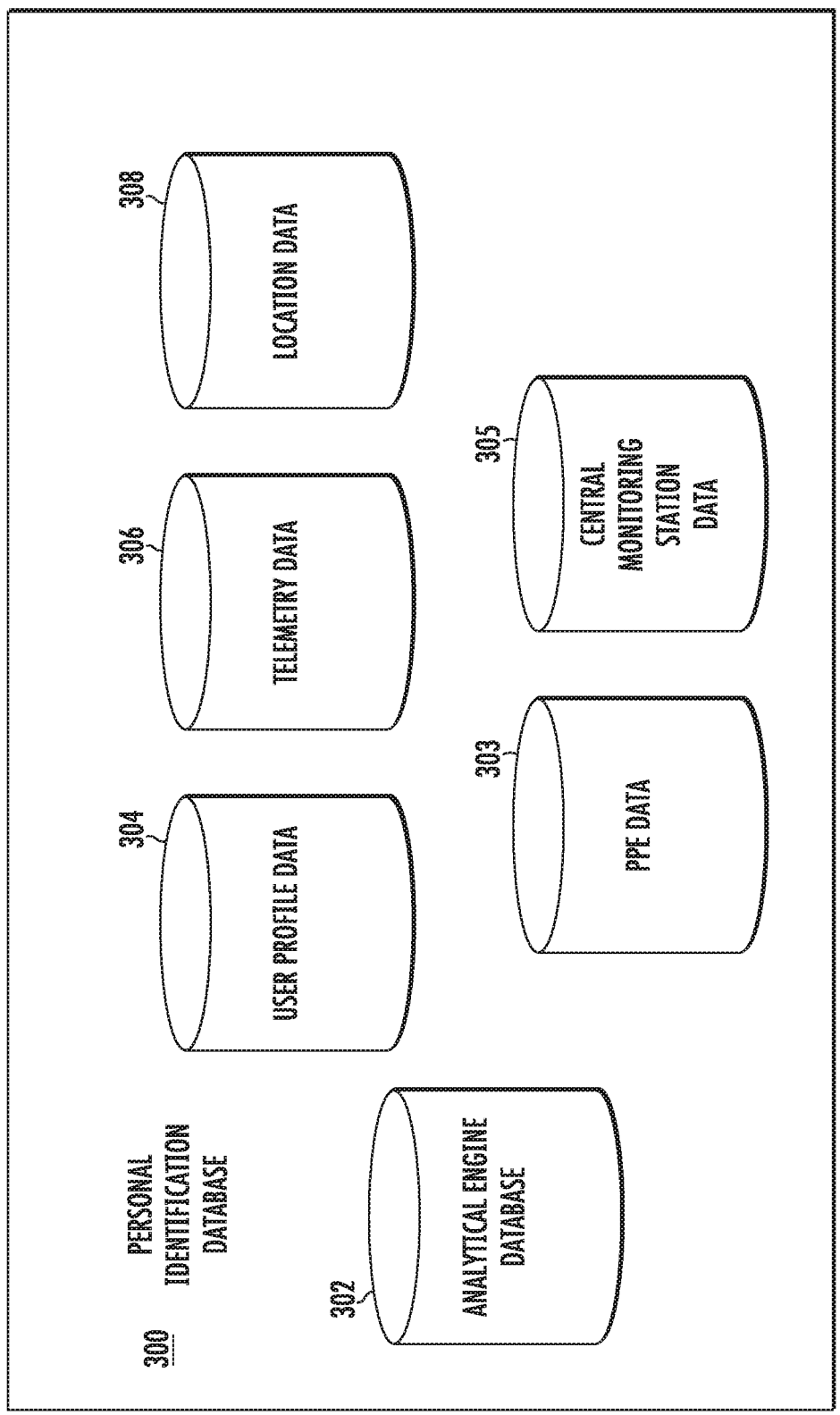
FIG. 3A illustrates an example personal identification database in accordance with some embodiments discussed herein.

FIG. 2 shows a schematic block diagram of circuitry 200, some or all of which may be included in, for example, central monitoring station 140, wireless tag readers 110A-110N, and/or wireless tags 105A-105N. Any of the aforementioned central monitoring station 140, wireless tag readers 110A-110N, and/or wireless tags 105A-105N may include one or more components of circuitry 200 and may be configured to, either independently or jointly with other devices in the communications network 120 perform the functions of the circuitry 200 described herein. As illustrated in FIG. 2, in accordance with some example embodiments, circuitry 200 can includes various means, such as processor 210, memory 220, communications module 230, and/or input/output module 240. In some embodiments, personal identification database 300 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 220) that is executable by a suitably configured processing device (e.g., processor 210), or some combination thereof.

Processor 210 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 210 comprises a plurality of processors. The plurality of processors may be embodied on a single central monitoring station 140, wireless tag reader 110A-110N, and/or wireless tag 105A-105N or may be distributed across a plurality of such devices collectively configured to function as circuitry 200. The plurality of processors may be in operative communication with each other and may be collectively configured to perform one or more functionalities of circuitry 200 as described herein. In an example embodiment, processor 210 is configured to execute instructions stored in memory 220 or otherwise accessible to processor 210. These instructions, when executed by processor 210, may cause circuitry 200 to perform one or more of the functionalities of circuitry 200 as described herein.

Whether configured by hardware, firmware/software methods, or by a combination thereof, processor 210 may comprise an entity capable of performing operations according to embodiments of the present invention while configured accordingly. Thus, for example, when processor 210 is embodied as an ASIC, FPGA or the like, processor 210 may comprise specifically configured hardware for conducting one or more operations described herein. Alternatively, as another example, when processor 210 is embodied as an executor of instructions, such as may be stored in memory 220, the instructions may specifically configure processor 210 to perform one or more algorithms and operations described herein, such as those discussed in connection with FIGS. 8-9.

Memory 220 may comprise, for example, volatile memory, non-volatile memory, or some combination thereof. Although illustrated in FIG. 2 as a single memory, memory 220 may comprise a plurality of memory components. The plurality of memory components may be embodied on a single central monitoring station 140, wireless tag reader 110A-110N, and/or wireless tag 105A-105N or distributed across a plurality of such devices. In various embodiments, memory 220 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 220 may be configured to store information, data (including data discussed with regards to personal identification database 300), applications, instructions, or the like for enabling circuitry 200 to carry out various functions in accordance with example embodiments of the present invention. For example, in at least some embodiments, memory 220 is configured to buffer input data for processing by processor 210. Additionally or alternatively, in at least some embodiments, memory 220 is configured to store program instructions for execution by processor 210. Memory 220 may store information in the form of static and/or dynamic information. This stored information may be stored and/or used by circuitry 200 during the course of performing its functionalities.

Communications module 230 may be embodied as any device or means embodied in circuitry, hardware, a computer program product comprising computer readable program instructions stored on a computer readable medium (e.g., memory 220) and executed by a processing device (e.g., processor 210), or a combination thereof that is configured to receive and/or transmit data from/to another device and/or network, such as, for example, a second circuitry 200 and/or the like. In some embodiments, communications module 230 (like other components discussed herein) can be at least partially embodied as or otherwise controlled by processor 210. In this regard, communications module 230 may be in communication with processor 210, such as via a bus. Communications module 230 may include, for example, an antenna, a transmitter, a receiver, a transceiver, network interface card and/or supporting hardware and/or firmware/software for enabling communications with another device of the personal protection system 100. Communications module 230 may be configured to receive and/or transmit any data that may be stored by memory 220 using any protocol that may be used for communications between devices of the personal protection system 100. Communications module 230 may additionally or alternatively be in communication with the memory 220, input/output module 240 and/or any other component of circuitry 200, such as via a bus.

Circuitry 200 may include input/output module 240 in some embodiments. Input/output module 240 may be in communication with processor 210 to receive an indication of a user input and/or to provide an audible, visual, mechanical, or other output to a user. As such, input/output module 240 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 200 is embodied as a server or database, aspects of input/output module 240 may be reduced as compared to embodiments where circuitry 200 is implemented as an end-user machine or other type of device designed for complex user interactions. In some embodiments (like other components discussed herein), input/output module 240 may even be eliminated from circuitry 200. Alternatively, such as in embodiments wherein circuitry 200 is embodied as a server or database, at least some aspects of input/output module 240 may be embodied on an apparatus used by a user that is in communication with circuitry 200. Input/output module 240 may be in communication with the memory 220, communications module 230, and/or any other component(s), such as via a bus. One or more than one input/output module and/or other component can be included in circuitry 200.

Personal identification database 300 and personal identification system 310 may also or instead be included and configured to perform the functionality discussed herein related to storing, generating, and/or editing data. In some embodiments, some or all of the functionality of storing, generating, and/or editing data may be performed by processor 210. In this regard, the example processes and algorithms discussed herein can be performed by at least one processor 210, personal identification database 300, and/or personal identification system 310. For example, non-transitory computer readable media can be configured to store firmware, one or more application programs, and/or other software, which include instructions and other computer-readable program code portions that can be executed to control each processor (e.g., processor 210, personal identification database 300, and personal identification system 310) of the components of circuitry 200 to implement various operations, including the examples shown above. As such, a series of computer-readable program code portions are embodied in one or more computer program goods and can be used, with a computing device, server, and/or other programmable apparatus, to produce machine-implemented processes.

In some embodiments, a personal identification database 300 may be provided that includes telemetry data 306, user profile data 304, location data 308, PPE data 303, central monitoring station data 305, and/or analytical engine data 302. Telemetry data 306 may include various information, such as measurements of temperature, pressure, motion, and the like. Location data 308 may include various information, such as global positioning data and other data related to the location of the PPE and/or user. User profile data 304, in some embodiments, may include biographical data, preference data, and the like associated with individual users or groups of users (e.g., preference data for fire fighter stations). PPE data 303 may include various information related to the personal protective equipment, such as model numbers, expiration dates, system requirements, air pressure readings of the PPE, maintenance dates/schedules, and any other pertinent information concerning the PPE. Central monitoring station data 305 may include various information related to the central monitoring station, such as location, employees, preferences, and any other pertinent information concerning the central monitoring station. Additionally or alternatively, the personal identification database 300 may include analytical engine data 302 which provides any additional information needed by the processor 210 in storing, generating, and editing data.

Personal identification system 310 can be configured to analyze multiple sets of data, such as the data in the personal identification database 300. In this way, personal identification system 310 may support multiple algorithms, including those discussed below with respect to telemetry data 306, user profile data 304, location data 308, PPE data 303, central monitoring station data 305, and/or analytical engine data 302, so that the selected algorithm may be chosen at runtime. Further, the present configuration can enable flexibility in terms of configuring additional contexts.

Figure 3B:
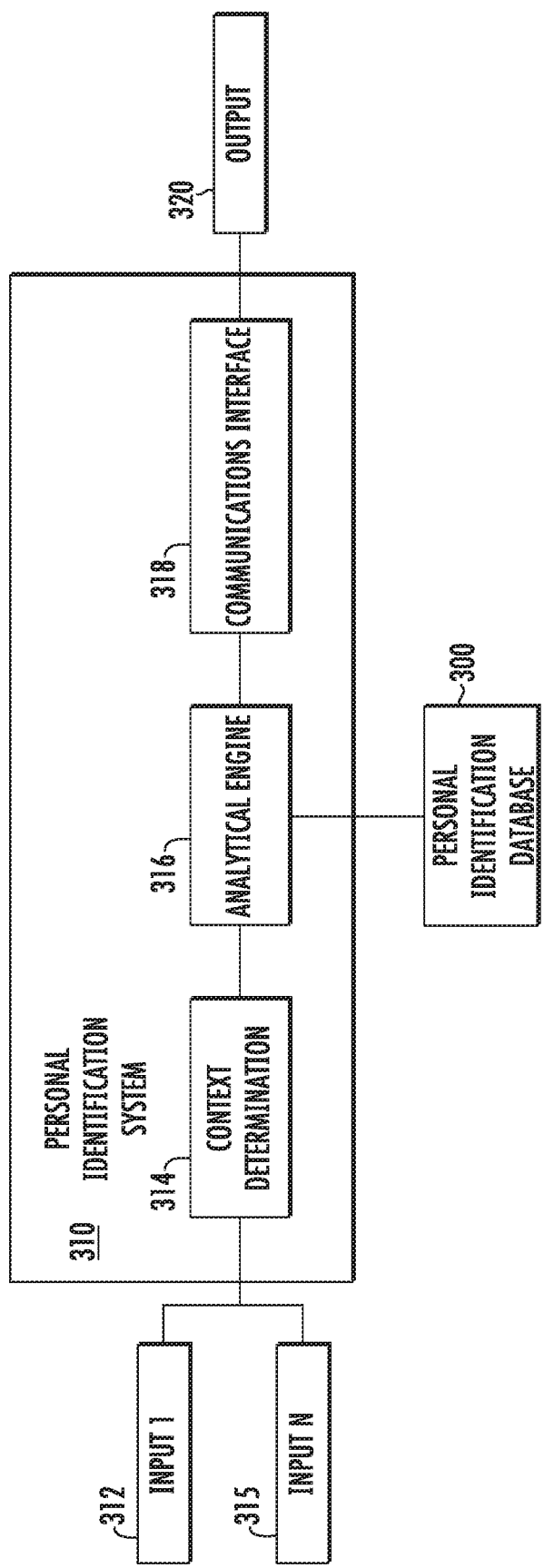
FIG. 3B illustrates an example personal identification system in accordance with some embodiments discussed herein.

In some embodiments, with reference to FIG. 3B, the personal identification system 310 may include a context determination module 314, an analytical engine 316, and communications interface 318, all of which may be in communication with the personal identification database 300. The personal identification system 310 may receive one or more signals (e.g., interrogation signals, response signals, etc.) that may contain information such as identification information, physical parameters, etc. and may generate the appropriate signals that may contain information such as identification information, physical parameters, etc. in response. The personal identification system 310 may use any of the algorithms or processes disclosed herein for receiving one or more signals (e.g., interrogation signals, response signals, etc.) that may contain information such as identification information, physical parameters, etc. and may generate the appropriate signals that may contain information such as identification information, physical parameters, etc. in response. In some other embodiments, such as when the circuitry 200 is embodied in a central monitoring station 140, wireless tag readers 110A-110N, and/or wireless tags 105A-105N, the personal identification system 310 may be located in another circuitry 200 or another device, such as another central monitoring station 140, wireless tag readers 110A-110N, and/or wireless tags 105A-105N or other client device.

The personal identification system 310 can be configured to access data corresponding to multiple signals (e.g., interrogation signals, response signals, etc.) that may contain information such as identification information, physical parameters, etc. and may generate the appropriate signals that may contain information such as identification information, physical parameters, etc. in response.

The system may receive a plurality of inputs 312, 315 from the circuitry 200 and process the inputs within the personal identification system 310 to produce an output 320, which may include signals containing appropriate information in response. In some embodiments, the personal identification system 310 may execute context determination using the context determination module 314, process the data in an analytical engine 316, and output the results via a communications interface 318. Each of these steps may pull data from a plurality of sources including the personal identification database 300.

When inputs 312, 315 are received by the personal identification system 310, a context determination using the context determination module 314 may be made. A context determination includes such information as a user or group of users preference data, what actuator initiated receipt of the input (e.g., what breathing apparatus is the actuator associated with), what type of input was provided (e.g., was an interrogation signal, response signal, identification information, and/or physical parameter received) and under what circumstances was receipt of the input initiated (e.g., where is the PPE located, when was the input received, what signal or receipt of information preceded the input, etc.). This information may give context to the personal identification system 310 analysis to determine the output. For example, the context determination module 314 may inform the personal identification system 310 as to the signal and/or information to output.

The personal identification system 310 may then compute the output using the analytical engine 316. The analytical engine 316 draws information about the applicable signal, information, user, PPE, central monitoring station, etc. from the personal identification database 300 and then, in light of the context determination module's 314 determination, computes an output, which varies based on the input. The communications interface 318 then outputs 320 the output to the circuitry 200 for storing, displaying on an appropriate interface, transmitting to other devices or server(s), or otherwise using for subsequent action. For instance, the context determination module 314 may determine that a physical parameter was received by the central monitoring station. Based on this information as well as the applicable user profile data, telemetry data, location data, PPE data, central monitoring data, etc., the analytical engine 316 may determine an appropriate output, such as displaying a distress alarm that the user associated with the breathing apparatus associated with the physical parameter is in need of help (e.g., when the air pressure of the breathing apparatus is too low or the user has not moved in a certain amount of time). The analytical engine 316 may receive unique identification information from a wireless tag. Based on this information as well as the applicable user profile data, telemetry data, location data, PPE data, central monitoring data, etc., the analytical engine 316 may determine that the user associated with the wireless tag is using a certain breathing apparatus. The central monitory station may then be able to monitor the movement and status of the user by monitoring the breathing apparatus. Similarly, the context determination module 314 may determine that location data was received and based on this and any additional contextual information, the analytical engine 316 may determine that the location of a user may need to be updated or modified.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information discussed herein can be based on data that is received, generated and/or maintained by one or more components of a local or networked system and/or circuitry 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 210, personal identification database 300, and/or personal identification system 310 discussed above with reference to FIG. 2, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 220) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Figure 4:
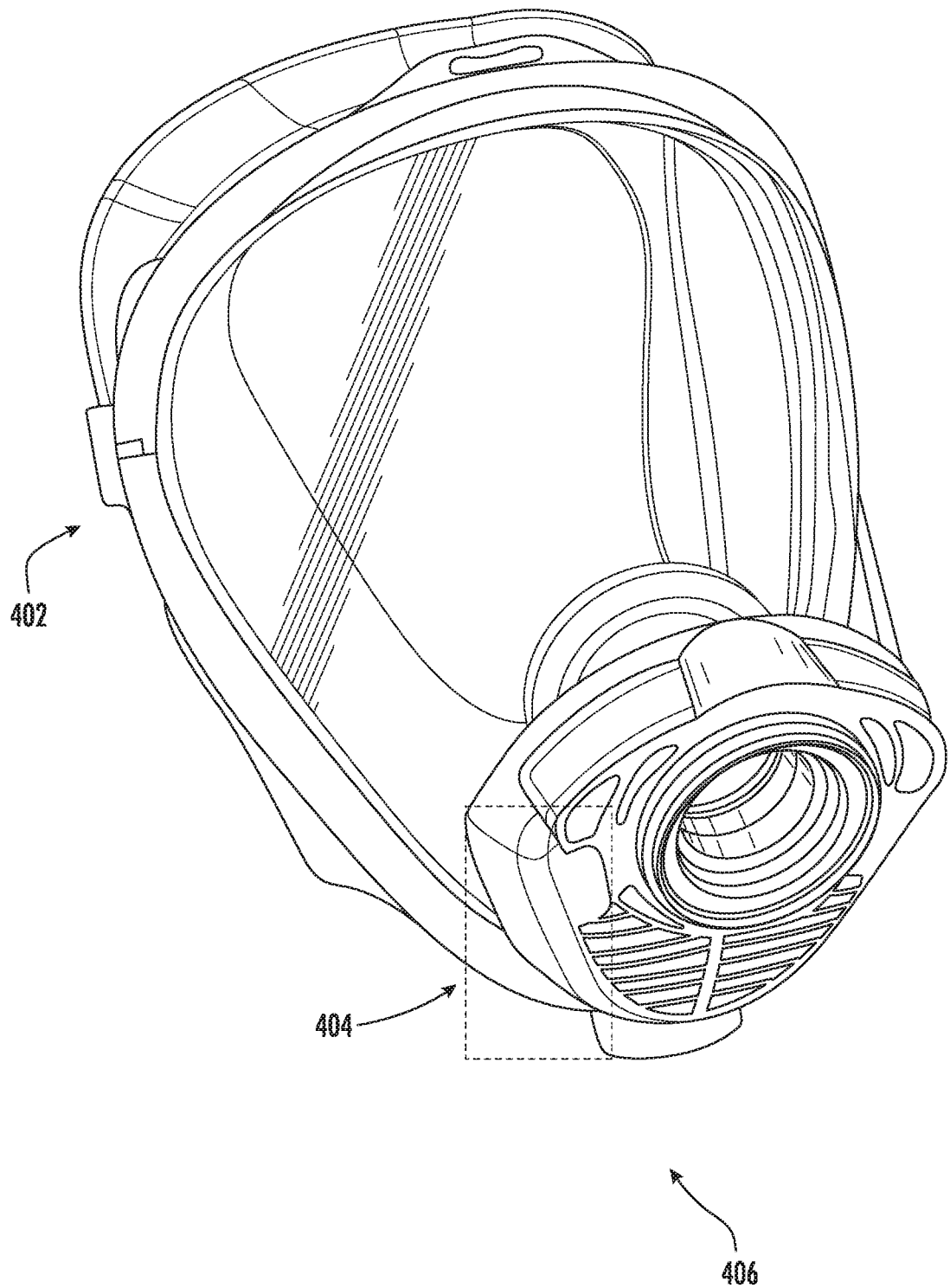
FIG. 4 illustrates an example face piece in accordance with some embodiments discussed herein.

FIG. 4 illustrates an example face piece in accordance with some embodiments discussed herein. As shown in FIG. 4, in some embodiments, the face piece 402 may include a wireless tag 404. The wireless tag 404 may include one or more parts of circuitry 200 as described herein. In some embodiments, the wireless tag 404 may be a radio-frequency identification (RFID) tag, while in some embodiments, the wireless tag 404 may be a Bluetooth tag. In some embodiments, the wireless tag 404 may be an active tag, a passive tag, or a battery-assisted passive tag. The wireless tag 404 may include an antenna structure (see e.g., antenna structure 406 embedded in the face piece 402) as part of the wireless tag 404. In some embodiments, a plurality of wireless tags 404 may be positioned on and/or incorporated into the face piece 402.

When the face piece 402 is coupled to a breathing apparatus, the wireless tag 404 may communicate with a wireless tag reader positioned on and/or incorporated into the breathing apparatus. The wireless tag reader may be located in or incorporated into any appropriate component of the breathing apparatus, such as the first or second stage regulator, first or second stage pressure reducer, pressure transducer, Heads-up-display, air tank, pressure valve, pressure gauge, back pack, personal alert safety system (PASS) device, straps/belt, etc. In some embodiments, the wireless tag reader may be located proximate to the wireless tag when the face piece and breathing apparatus are mated or coupled. The location of the wireless tag reader and the location of the wireless tag may be configured to reduce the distance between the wireless tag reader and the wireless tag when the face piece and breathing apparatus are mated or coupled. The location of the wireless tag reader and the location of the wireless tag may be configured to reduce the distance between the wireless tag reader and the wireless tag when the face piece and breathing apparatus are mated or coupled while also reducing interference from other wireless tags/wireless tag readers.

Figure 5:
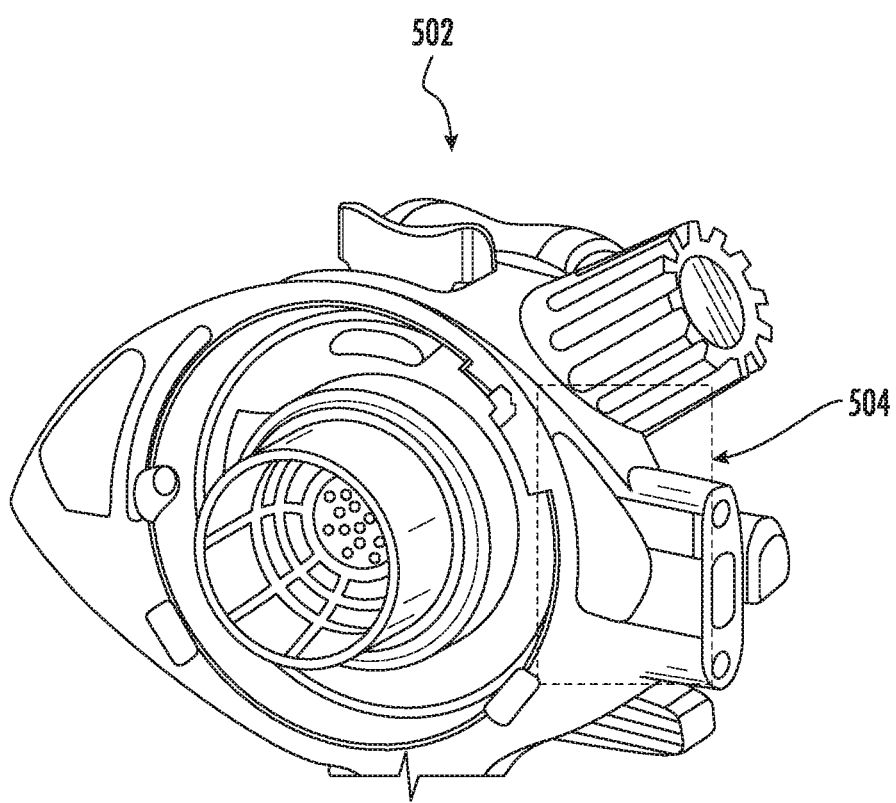
FIG. 5 illustrates an example second stage regulator in accordance with some embodiments discussed herein.

FIG. 5 illustrates an example embodiment where the wireless tag reader is located on a second stage regulator. In particular, FIG. 5 illustrates a second stage regulator 502 including a wireless tag reader 504 in accordance with some embodiments discussed herein. The wireless tag reader 504 may be mounted on the second stage regulator 502 or incorporated into the second stage regulator 502. In some embodiments, the second stage regulator 502 may include a plurality of wireless tag readers 504 located on or incorporated into the second stage regulator 502. The wireless tag reader 504 may be located on or incorporated into any section of the second stage regulator 502 such that the wireless tag reader 504 can communicate with the wireless tag (such as wireless tag 404).

Figure 6:
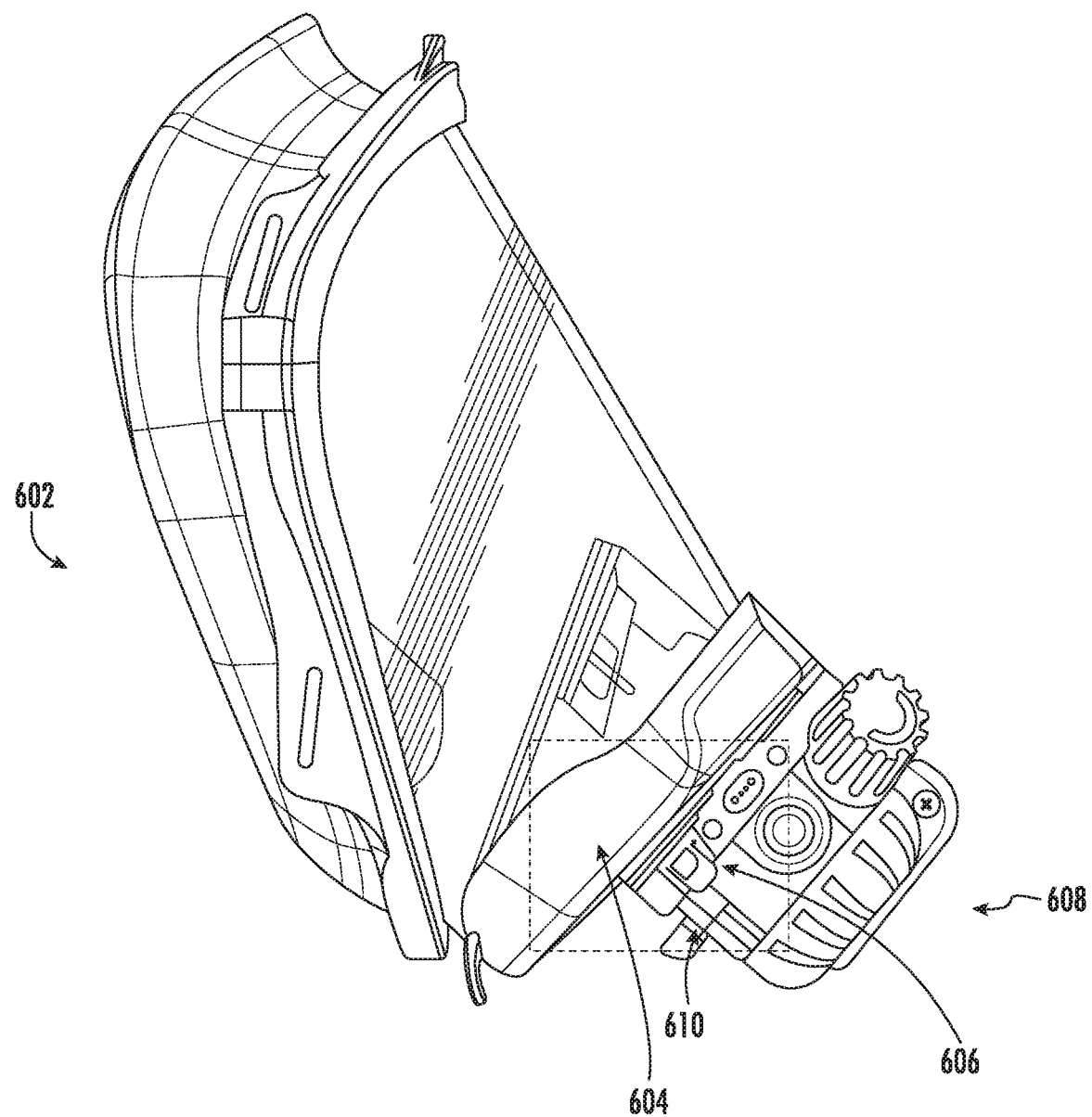
FIG. 6 illustrates an example mated face piece and second stage regulator in accordance with some embodiments discussed herein.

The face piece, such as face piece 402, may be mated with or mechanically coupled to the breathing apparatus by way of the second stage regulator, such as second stage regulator 502. The coupling of the face piece to the breathing apparatus, such as via the second stage regulator, may be performed by methods known in the art, such as twisting, snapping, adhering, buttoning, or otherwise locking the components together. FIG. 6 illustrates an example face piece and second stage regulator coupled together in accordance with some embodiments discussed herein. In particular, FIG. 6 illustrates a face piece 602 coupled to a second stage regulator 608. The face piece 602 includes a wireless tag 610 and the second stage regulator 608 includes a wireless tag reader 606. The coupling of the face piece 602 to the second stage regulator 608 is shown by the dotted box 604. As shown in FIG. 6, when the face piece 602 is coupled to the breathing apparatus by way of the second stage regulator 608, the wireless tag 610 is in proximity to the wireless tag reader 606 such that the wireless tag 610 and the wireless tag reader 606 can communicate. Other positions of the wireless tag reader 606 and wireless tag 610 may also allow the wireless tag 610 to be in proximity to the wireless tag reader 606 such that the wireless tag 610 and the wireless tag reader 606 can communicate.

In some embodiments, the breathing apparatus may also include one or more sensors or other measurement devices. One or more sensors or other measurement devices may be located throughout the breathing apparatus and may measure various parameters, such as temperature, pressure, motion, location, battery life, pressure in the air tank, etc. to monitor the breathing apparatus, the user wearing the breathing apparatus, the face piece, and the environment in which the user is located. The one or more sensors or other measurement devices may be located on or incorporated into the face piece, such as face piece 402, 602; the first or second stage regulator, such as second stage regulator 502, 608; air tank; back pack; straps/belt; the like, and combinations thereof.

The breathing apparatus may also include indicator lights or sound alarms to indicate high or low measured parameters.

Once coupled, the face piece, such as face piece 402, 602, and the breathing apparatus may be operatively connected such that air may flow through the breathing apparatus to the face piece. The flow of air may be initiated or actuated by any suitable methods, such as actuating a valve to initiate the flow of air from the breathing apparatus to the face piece, e.g., from the air tank to the face piece.

Figure 7A:
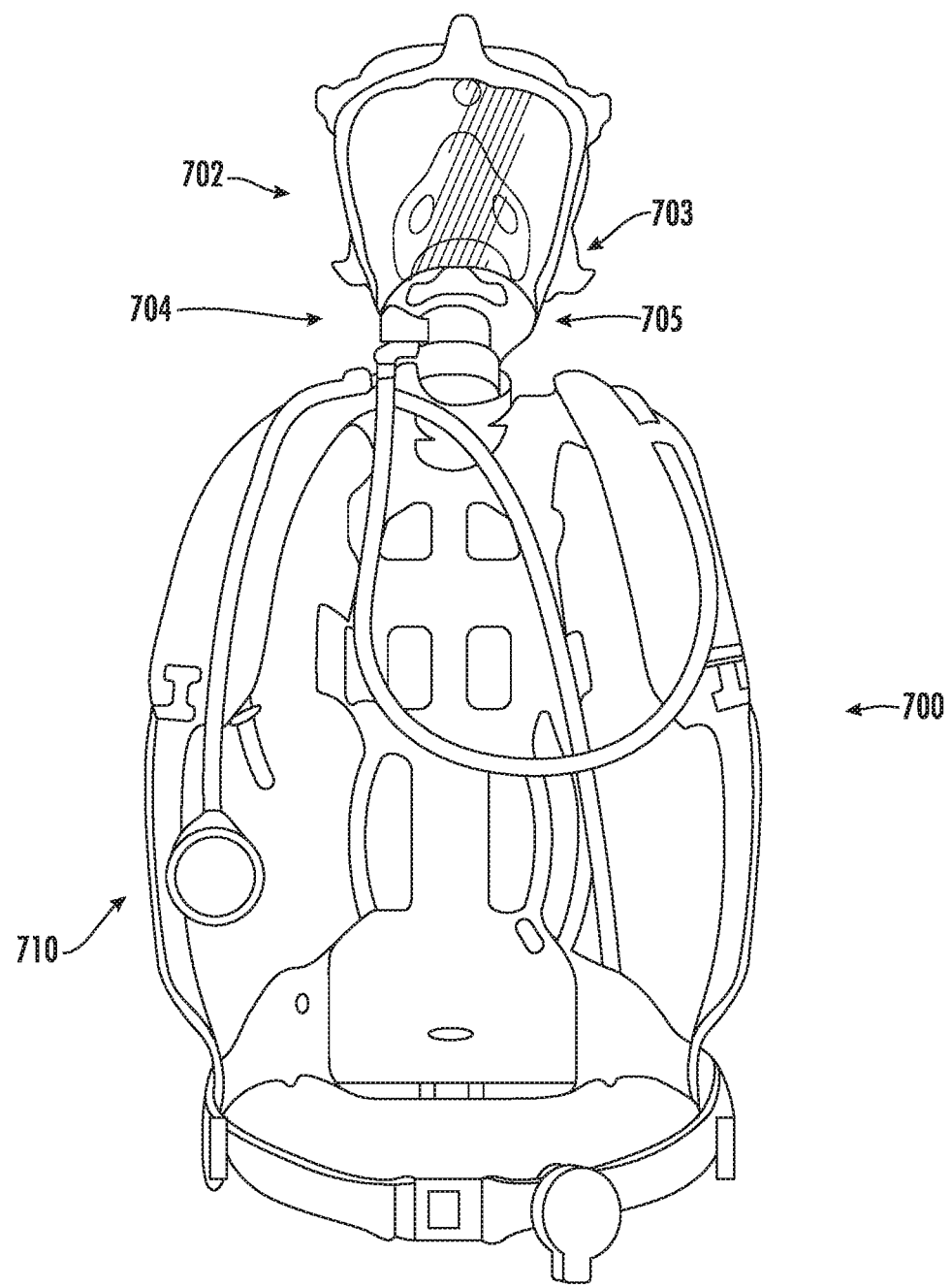
FIGS. 7a-7b illustrate an example personal protective equipment in accordance with some embodiments discussed herein.

FIG. 7a illustrates an example mated face piece and breathing apparatus in accordance with some embodiments discussed herein. In particular, FIG. 7a illustrates a face piece 702 and breathing apparatus 700 including a second stage regulator 704, and pressure gauge 710. The embodiment illustrated in FIG. 7a also includes a wireless tag 703 and wireless tag reader 705. In the embodiment illustrated in FIG. 7a, the wireless tag 703 is located on the face piece 702 and the wireless tag reader 705 is located on the second stage regulator 704. As noted above, the wireless tag reader 705 may be located on or incorporated into any component of the breathing apparatus 700.

Figure 7B:
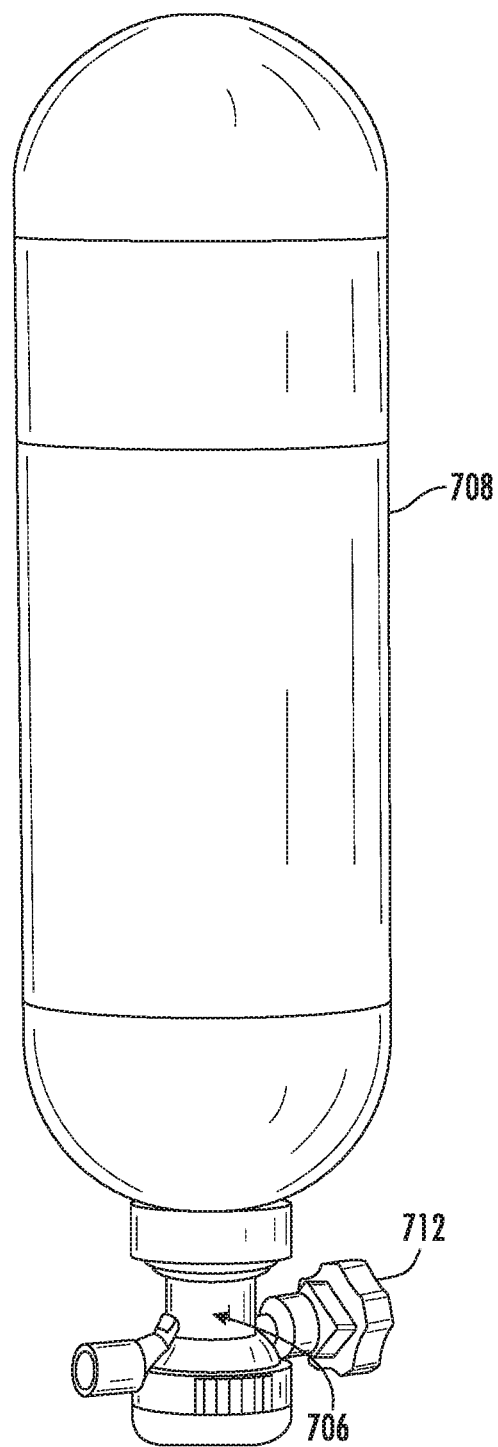

FIG. 7b provides a view of an air tank 708 that would be part of the breathing apparatus illustrated in FIG. 7a. In particular, FIG. 7b illustrates the air tank 708, valve 706, and actuator 712. The placement of the valve 706 allowing air to flow from the breathing apparatus 700 to the face piece 702 may be located at any suitable location on the breathing apparatus 700. Similarly, the actuator 712 may be placed at any suitable location on the breathing apparatus 700.

In some embodiments, the actuator 712 may be actuated to allow air to flow through the breathing apparatus 700 to the face piece 702. In particular, a user may activate the actuator, such as actuator 712, by, for example, pressing a button (e.g., when the actuator is a button), turning a wheel, knob, or key (e.g., when the actuator is a handwheel, knob, or key), flipping a switch (e.g., when the actuator is a switch), and/or the like. The actuator 712 may be connected to the valve 706 such that actuation of the actuator 712 opens the valve 706 allowing air to flow through the breathing apparatus 700 to the face piece 702, e.g., from the air tank 708 to the face piece 702. The actuation of the actuator 712 and the resulting flow of air through the breathing apparatus 700 to the face piece 702 may cause the wireless tag reader 705 to transmit an interrogation signal. The wireless tag reader 705 may be turned on, energized, or receive an indication to transmit an interrogation signal. For instance, the wireless tag reader 705 may be activated by a microprocessor in response to a sensor detecting air pressure as a result of the air tank being opened. For instance, in some embodiments, a sensor on the breathing apparatus 700 may detect a set amount of air pressure and then communicate with a microprocessor on the breathing apparatus 700 to activate the wireless tag reader 705. Any of the components discussed with regards to circuitry 200 may be utilized to activate the wireless tag reader 705.

Once activated, the wireless tag reader 705 may transmit the interrogation signal at regular intervals of time over a set period of time. The wireless tag reader 705 may be programed to turn on for a set period of time in response to actuation of the breathing apparatus. The set period of time may be less than about 30 seconds, less than about 1 minutes, less than about 2 minutes, less than about 3 minutes, less than about 4 minutes, less than about 5 minutes, etc. In some embodiments, the wireless tag reader 705 may be programed to turn on for a set period of time (e.g., the periods of time set forth above), turn off for a set period of time (e.g., the periods of time set forth above), and then turn on again for a set period of time (e.g., the periods of time set forth above). In some embodiments, the wireless tag reader 705 is programed to alternate between periods of transmitting an interrogation signal and periods of not transmitting an interrogation signal. Variations on the pattern of transmitting the interrogation signal may be used without deviating from the intent of the present disclosure. In some embodiments, the interrogation signal may energize the wireless tag such that an antenna structure (e.g., antenna structure 406) of the wireless tag is powered sufficiently to transmit and receive signals.

The wireless tag 703 may then receive the interrogation signal, generate and transmit a response signal that may include identification information to the wireless tag reader 705. The identification information may include data sufficient to identify a user of the face piece 702. The identification information may be any of the user profile data, PPE data, etc. previously discussed. The wireless tag reader 705 may compare one or more characteristics of the response signal to one or more characteristics of a response signal from another wireless tag to determine which wireless tag is associated with the face piece coupled to the breathing apparatus. The one or more characteristics may include a time of arrival of the response signal, an amount of energy associated with the response signal, an angle associated with the receiving signal, or combinations thereof.

In some embodiments, the breathing apparatus 700 and/or the face piece 702 may include a communication device to communicate with a central monitoring station, the communication device including one or more components of circuitry 200. For instance, a communication device may be located on the breathing apparatus 700 and/or face piece 702 to communicate various physical parameters and/or identification information to the central monitoring station. For instance, the communication device may be incorporated into breathing apparatus 700 and/or face piece 702. The communication device may communicate with the wireless tag reader 704 to convey identification information to the central monitoring station. In some embodiments, the wireless tag reader 704 may include one or more components of circuitry 200 sufficient to communicate with a central monitoring station. The wireless tag reader 704 may transmit identification information and/or physical parameters to the central monitoring station.

The physical parameters may include any physical parameters concerning the user of the PPE, environment in which the PPE is located, the PPE, or other users in proximity to the PPE. For instance, the physical parameters may include a breathing rate of the user of the face piece, a location of the user of the face piece, pressure of air flow in a regulator of the breathing apparatus, air pressure in an air tank of the breathing apparatus, battery level of the breathing apparatus, alarm status of a personal alert safety system device, operation mode of the personal alert safety system device, heat alert activation, a battery level of the wireless tag reader, or combinations thereof. The PPE may include one or more sensors or other measuring devices to collect and/or monitor these physical parameters.

When in receipt of the identification information and/or physical parameters, the central monitoring station may pair the identification information with PPE data, location data, etc. to monitor the user of the PPE. The central monitoring station can thereby efficiently and effectively monitor users of the PPE without the need for the user to take additional steps for identification. That is, the user of the PPE may merely need to activate the breathing apparatus (e.g., activate the air flow through the breathing apparatus to the face piece) after connecting the breathing apparatus to the face piece for the user to be identified and then accurately monitored. The user of the PPE may no longer need to separately, manually scan an RFID tag or log-in to the PPE for the user to be accurately identified and monitored.

Physical parameters may be measured by one or more measuring devices such as sensors located on or incorporated into the face piece 702 and/or breathing apparatus 700. As shown in FIG. 7, the breathing apparatus 700 may include a pressure gauge 710 to measure the pressure in the air tank. Other mechanisms of measuring physical parameters may be incorporated into the breathing apparatus 700. The measuring devices may communicate with the wireless tags 703 and/or wireless tag readers 705 to convey the information to the central monitoring station.

The breathing apparatus may also include various alarms, such as a low-air alarms (e.g., an audible low-air alarm when the air in the air tank is low, audible sufficient for the user to hear, or a visual low-air alarm such as an LED light that may flash when the air in the air tank is low, which may be needed for dark, high-noise environments) or low battery alarms (e.g., audible or visual). The breathing apparatus may include a personal alert safety system ("PASS") device to notify others that the user is in distress.

The breathing apparatus may include various components, such as a first stage pressure reducer, second stage pressure reducer, pressure transducer, Heads-up-display (HUD), back frame, harness system with shoulder straps and waist belt, regulator receivers, power supplies (e.g., batteries), air connections (e.g., for emergency intervention), voice amplification systems, visual displays/interfaces, etc. for improving the utility of the breathing apparatus. The personal protective equipment may be a PPE with a detachable facemask or face piece. For instance, in some embodiments, the face piece and breathing apparatus may be part of a self-contained breathing apparatus or a powered air purifying respirator. In some embodiments, the self-contained breathing apparatus is an open-circuit self-contained breathing apparatus or a closed-circuit self-contained breathing apparatus.

Figure 8:
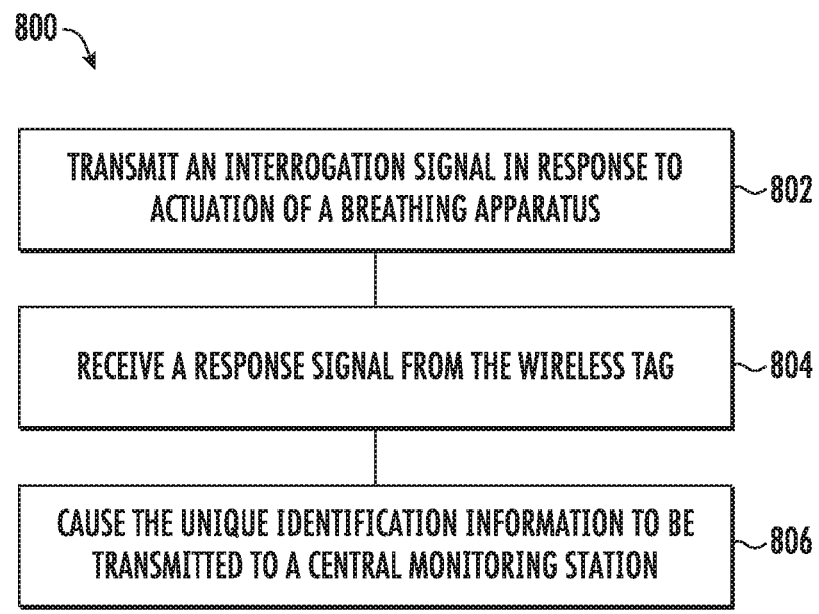
FIG. 8 illustrates a flow diagram of an example system in accordance with some embodiments discussed herein.

FIG. 8 illustrates a flow diagram of an example system in accordance with some embodiments discussed herein. In particular, FIG. 8 illustrates a method of monitoring personal protective equipment. In the embodiment illustrated in FIG. 8, the method 800 includes transmitting an interrogation signal in response to actuation of a breathing apparatus 802, receiving a response signal from the wireless tag 804, and causing unique identification information to be transmitted to a central monitoring station 806. In some embodiments, the response signal may include the unique identification information.

Figure 9:
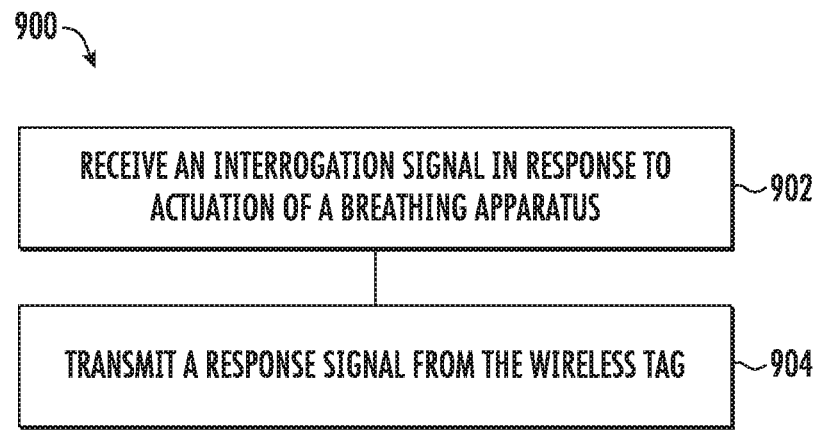
FIG. 9 illustrates a flow diagram of an example system in accordance with some embodiments discussed herein.

FIG. 9 illustrates a flow diagram of an example system in accordance with some embodiments discussed herein. In particular, FIG. 9 illustrates a method of monitoring personal protective equipment in accordance with some embodiments discussed herein. As shown in FIG. 9, the method 900 includes receiving an interrogation signal in response to actuation of a breathing apparatus 902 by the wireless tag and transmitting a response signal from the wireless tag 904.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for monitoring a wireless communication enabled personnel protective equipment (PPE), the system comprising:
 a face piece having a wireless tag configured to store unique identification information,
 wherein the unique identification information identifies a user associated with the wireless communication enabled PPE; and
 a breathing apparatus corresponding to the wireless communication enabled PPE and configured to be coupled to the face piece, the breathing apparatus comprising:
  a wireless tag reader, wherein the wireless tag reader is configured to:
   transmit an interrogation signal on actuation of the breathing apparatus, after the breathing apparatus is coupled to the face piece, and
   receive a response signal comprising the unique identification information from the wireless tag,
   wherein the breathing apparatus is configured to transmit the unique identification information to a central monitoring station, and
   wherein the breathing apparatus is configured to supply air to the face piece.

2. The system according to claim 1, wherein the breathing apparatus further comprises a valve configured to regulate air flow through the breathing apparatus and an actuator configured to actuate the valve to allow air to flow through the breathing apparatus, wherein the breathing apparatus is actuated by actuation of the valve.

3. The system according to claim 2, wherein the wireless tag reader is configured to be switched on for a set duration of time when the actuator is actuated.

4. The system according to claim 1, wherein the breathing apparatus further comprises a regulator configured to be removably coupled to the face piece and to supply air from an air tank to the face piece, wherein the wireless tag reader is positioned on the regulator.

5. The system according to claim 1, further comprising one or more sensing units configured to detect one or more physical parameters associated with a user of the face piece, the face piece, the breathing apparatus, or a combination thereof, the one or more sensing units being positioned on the face piece, the breathing apparatus, or a combination thereof.

6. The system according to claim 5, wherein the one or more physical parameters correspond to at least one of: a breathing rate of the user of the face piece, a location of the user of the face piece, pressure of air flow in a regulator of the breathing apparatus, air pressure in an air tank of the breathing apparatus, battery level of the breathing apparatus, alarm status of a personal alert safety system device, operation mode of the personal alert safety system device, heat alert activation, or a battery level of the wireless tag reader.

7. The system according to claim 5, further comprising a communication device positioned on the face piece, the breathing apparatus, or combination thereof, wherein the communication device is configured to transmit the one or more physical parameters to the central monitoring station.

8. The system according to claim 5, wherein the wireless tag reader is configured to transmit the one or more physical parameters to the central monitoring station.

9. The system according to claim 1, wherein the wireless tag reader is positioned proximate to the wireless tag when the breathing apparatus is coupled to the face piece.

10. The system according to claim 1, wherein the wireless tag is a Bluetooth tag, and the wireless tag reader is a Bluetooth transceiver unit.

11. The system according to claim 1, wherein the wireless tag is an RFID tag, and the wireless tag reader is an RFID transceiver unit.

12. The system according to claim 1, wherein the unique identification information is stored in a database of the central monitoring station, wherein the database is configured to store unique identification information for each user of the breathing apparatus and identification information for the breathing apparatus, and wherein the central monitoring station is configured to pair the unique identification information to the identification information of the breathing apparatus.

13. The system according to claim 1, wherein the wireless tag reader is configured to interrogate the wireless tag at a regular interval of time to identify the face piece.

14. The system according to claim 1, wherein the interrogation signal, from the wireless tag reader, is configured to energize the wireless tag such that an antenna structure of the wireless tag is powered sufficiently to transmit and receive signals.

15. The system according to claim 1, wherein the wireless tag reader is configured to compare one or more characteristics of the response signal to one or more characteristics of a response signal from another wireless tag to determine which wireless tag is associated with the face piece coupled to the breathing apparatus, wherein the one or more characteristics comprises at least one of:
 a time of arrival of the response signal,
 an amount of energy associated with the response signal, or
 an angle associated with the response signal.

16. A method of monitoring a wireless communication enabled personnel protective equipment (PPE), the method comprising:
 transmitting an interrogation signal in response to actuation of a breathing apparatus, after the breathing apparatus is mechanically coupled to a face piece,
 wherein the face piece comprises a wireless tag configured to store unique identification information and the breathing apparatus comprises a wireless tag reader configured to transmit the interrogation signal, wherein the unique identification information identifies a user associated with the wireless communication enabled PPE, and wherein the breathing apparatus is configured to supply air to the face piece;

receiving a response signal from the wireless tag, the response signal comprising the unique identification information; and causing the unique identification information to be transmitted to a central monitoring station.

17. The method according to claim 16, wherein actuation of the breathing apparatus occurs by actuation of a flow of air through the breathing apparatus.

18. The method according to claim 16, wherein the breathing apparatus is a powered air purifying respirator or a self-contained breathing apparatus.

19. The method according to claim 16, wherein the unique identification information further corresponds to an identity of a first responder or industrial worker using the face piece.

* * * * *